June 18, 1963     H. S. POLIN     3,094,115
TOOTH MOBILITY INDICATOR
Filed June 8, 1960
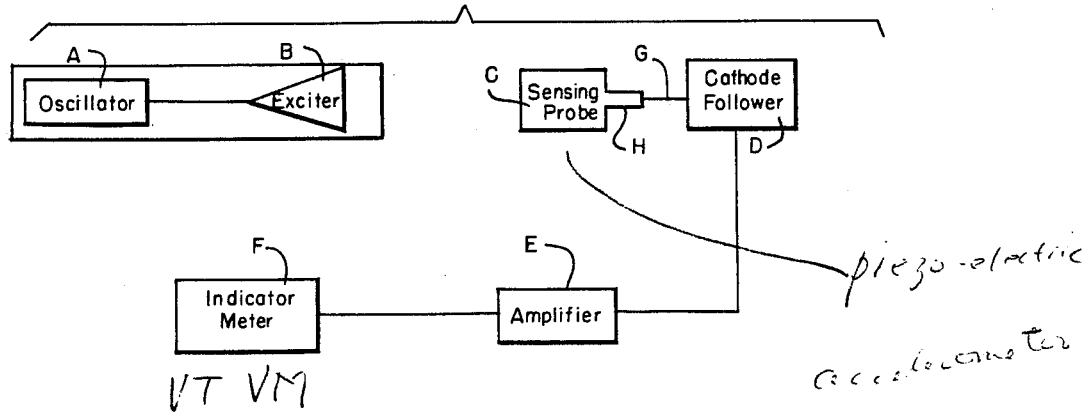
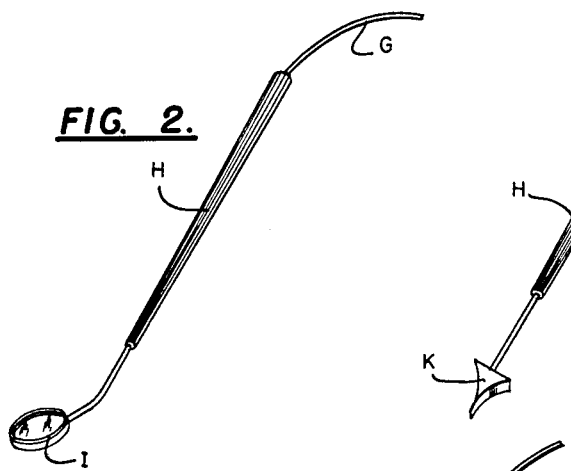
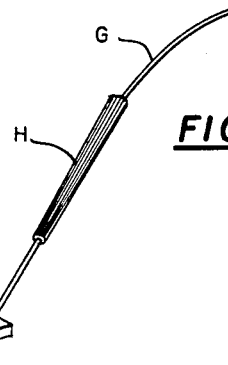
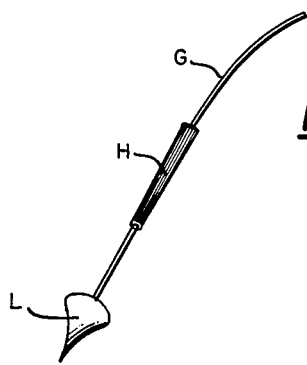
INVENTOR
Herbert S. Polin
BY *Moore & Hall*
ATTORNEYS

United States Patent Office 3,094,115
Patented June 18, 1963

3,094,115
TOOTH MOBILITY INDICATOR
Herbert S. Polin, Veyrier, Switzerland
Filed June 8, 1960, Ser. No. 34,826
7 Claims. (Cl. 128—2.1)

The present invention concerns apparatus and method for measuring the tightness of teeth by sonic and ultrasonic technique, as an indicator of the condition of the oral cavity in toothed mammals and of the state of the body as a whole.

It is an object of the invention to provide means for applying vibratory energy to a tooth or teeth and to measure the transmission characteristic of the bond between the tooth and the bony structure supporting it. The transmission properties have been found to vary in amplitude and character with the condition of the bond.

It is an object of the invention to provide a diagnostic method of determining the health of the oral cavity, of the body as a whole and, inter alia, an early indication of pregnancy.

It has been found that in the onset of pregnancy, the hormonic and other chemical changes of the body tend to increase the utilization of ascorbic acid. Since a high level of ascorbic acid in the blood has been found to be normally associated with teeth rigidity and since the onset of pregnancy has been correlated with a sudden tightening of teeth in the mouths of women previously found to have some degree of tooth mobility, the observation has been made on a large group of clinical patients that the condition of pregnancy influences the degree of mobility of the teeth. It is the ascorbic acid level that is the essential element in this condition and many thousands of cases, both male and female have demonstrated that teeth of high mobility can be made substantially more rigid by the application of high concentrations of ascorbic acid. Thus, a tooth mobility measuring device, measuring the teeth of a female patient over a period of time and registering the normal mobility as high, can, when at some later date the same patient is suddenly found to have reduced the mobility value sharply without a change in diet, be said to indicate the probable onset of pregnancy.

It is an object of the invention to establish a measurement parameter for use as a reference or base line and to measure departures therefrom in terms of degree. In the clinical study of teeth and in the diagnosis of periodontal degeneration, an indication of the state of well being of the oral cavity and its bony structure may be found in the degree of tightness of the teeth. The firmness of a tooth's support by the jawbone and related periodontal tissue varies from individual to individual and may be different during the day and at night, before and after meals, etc. However, when a curve for the individual, in terms of these variations, has been plotted, it has been found that departure from this curve is indicative of general body change of diagnostic significance.

Recognition of the importance of tooth mobility as an element in diagnostic evaluation dates back many years, but it is only in the past twenty years or so that workers in the field have attempted to replace the subjective and unsatisfactory hand test of the clinician with a method that permitted a measurement of reproduceable character.

Apparatus has been described in the art by which the application of a stated force to the tooth caused it to bend away from the direction of the applied force and the degree of change from its resting position could be measured and reported in units of mobility. Such apparatus is objectionable on several counts, the most important being: (a) the subject must be held in a rigid harness to permit the application of the force to the tooth to act upon the tooth alone; and (b) the point on the tooth at which the measuring force is applied must be accurately stated for reproduceable results and, because of the variations in the shape of teeth and the requirement that the force probe be pointed, comparative tests are difficult and nonprecise; and (c) it is a very time-consuming process requiring hours to prepare the subject, align the apparatus and make the measurements. As a result, reliable, reproduceable results are often not obtained.

Another type of equipment mentioned in the literature, but which has not been used beyond experimental study, is to set a tooth into vibration by touching an oscillating probe to it and measuring the amplitude of the vibrating tooth at the driven frequency. This method, too, has certain objections, although theoretically it would appear that the amplitude of vibration is a function of the rigidity with which the tooth is held in its matrix, and thus a measure of mobility. The objections to this method are: (a) the oscillating probe used to set the tooth into vibration corresponds to the constant force on the static measuring system previously described and is subject to the difficulties mentioned in (a) and (b) of that system. The amplitude of the vibrating tooth is very sensitive to the pressure applied and to the position of the probe on the tooth. Thus, reproduceability is most difficult. (b) In measuring amplitude, the question of resonant frequencies in the tooth must be considered as error factors. (c) The equipment is large and complex.

The system to be described utilizes sonic or ultrasonic vibration phenomena as a tooth mobility measuring device having the following unique characteristics:

(1) The measuring probe is substantially insensitive to pressure or positioning on the tooth;

(2) The probe is miniaturized and fits the subject's mouth with no discomfort.

(3) All auxiliary equipment is small and portable and requires no calibrating before or between use.

By referring to the appended drawing, the theory of operation of the apparatus can be seen and the method readily understood.

In the figures, like numerals refer to like parts throughout.

FIGURE 1 is a schematic showing in block diagram of a preferred form of the invention.

FIGURE 2 is a schematic representation of one form of probe to be used with the circuit of FIGURE 1 in practicing the invention.

FIGURE 3 is a schematic representation of another form of probe.

FIGURE 4 is a schematic showing of a third form of probe.

As oscillator A, which may be single frequency or have a range of frequencies, drives an exciter B. The exciter B may be any form of transducer, but preferably it is an oscillating element shaped like the pads of the headrest of a standard dental chair. C is a miniature probe, preferably a piezo-electric transducer of the accelerometer type having a face of from five to twenty millimeters in diameter and mounted on a handle of a size approximating the dimensions of the normal dental instruments, like a pick or scalpel. D, E and F comprise electronic circuitry having the functions of a cathode follower, a fixed frequency amplifier and a vacuum tube voltmeter calibrated in arbitrary mobility units, respectively.

The probe C is connected to cathode follower D by a long, flexible line G which runs through the handle H to the piezo-electric crystal in the face of the probe C. The probe head containing the crystal may be round and flat, as at I in FIGURE 2. The working face of the probe may be flat or curved, as shown at K in FIGURE 3. The curvature may be convex or concave, in the form shown at K in FIGURE 3 and at L in FIGURE 4. Again, a cast may be made of a selected tooth or group of teeth and the probe face may be molded to fit the individual patient.

In operation, the patient is seated in a dental chair with his head resting upon the oscillating element B, driven by oscillator A. Probe C is placed upon one tooth and a reading is registered on meter F. This reading represents attenuation along the conductivity path of the imposed oscillation from a point on the patient's head, through jawbone to tooth. By selecting that frequency which is most responsive to attenuation by discontinuity in the coupling at the tooth-jaw interface, the sensitivity of the instrument is maximized. What the transducer probe C is registering is the departure in amplitude and frequency of the signal received at C from the characteristics of the input signal at B.

While the system described has been operated at frequencies ranging from a few hundred cycles per second through ultrasonic frequencies in the range of megacycles, both pulsed and continuous, a satisfactory system operates at 1000 cycles in a transistorized circuit having a power output of less than one watt at the oscillator.

As noted above, it is an object of this invention to establish a measurement parameter for use as a reference or base line, and to measure departures therefrom in terms of degree, as comprising significant information. Using this system, it has been possible to follow the effect of a drug, such as ascorbic acid, upon the mobility of the teeth in a patient suffering from a deficiency of ascorbic acid.

It is apparent that the input signal can be applied directly to the jaw as well as to the skull bone, as a variation of technique in use.

One form of instrument for measuring tooth mobility according to FIGURES 1 and 2, has been tested successfully and possesses the following component characteristics:

(A) Oscillator 1000 c.p.s. transistorized, output about 10 mw. minimum, into a 3 ohm load.

(B) Exciter, 4-inch loudspeaker, mounted on wood or other suitable material, shaped to fit back of head or jaw.

(C) Sensing Probe, piezo-electric transducer of the accelerometer model 303 or similar manufactured by Columbia Research Laboratories.

(D) Cathode Follower, transistorized with input impedance of 100 megohms and output impedance of about 200 ohms.

(E) and (F) Amplifier 1000 c.p.s. and Indicator Meter, VSWR amplifier model 441, manufactured by NARDA, which consists of a high gain 1000 c.p.s. amplifier with a bandwidth of 30 c.p.s., a calibrated attenuator over 60 db, variable gain control and a meter indicating the signal level. A 12-volt battery supplies sufficient energy permitting one to build into the VSWR amplifier unit A—Oscillator 1000 c.p.s. and unit D—Cathode Follower.

This structure was calibrated by applying Sensing Probe C directly to Exciter B, and setting the gain control of Amplifier E to maximum deflection on Indicator F. The Exciter B is applied to the patient and Sensing Probe C to the tooth under observation. One then adjusts attenuator db ranges to obtain reading on Indicator Meter F and notes db-level.

The probe may be incorporated in a dental mirror as shown at I in FIGURE 2.

A coded signal in the form of ultrasonic oscillations may be applied to the tooth structure and relative discontinuity measured by measuring departures in frequency fidelity and amplitude between the coded input signal and the received signal.

While there have been described above what are presently believed to be the preferred forms of the invention, variations thereof will be obvious to those skilled in the art and all such changes and variations which fall within the spirit of the invention are intended to be covered by the generic terms in the appended claims, which are variably worded to that end.

I claim:

1. A tooth mobility measuring instrument for measuring the firmness of the support of a tooth by its matrix, the jawbone and related periodontal tissue, comprising a small probe having a piezo-electric transducer portion suited for application to a tooth, for ready insertion into the oral cavity and suited to be placed in operating contact with an individual tooth, an electric circuit connected to said transducer, indicating means connected in said circuit, and an exciter means for applying a mechanical vibration of preselected characteristics to the bony structure of a patient's head whereby said signal is transmitted through the support matrix of a tooth under examination and through said transducer portion of said probe which transforms the resultant vibration received through at least part of the tooth being tested into a corresponding electrical signal in said electric circuit which is supplied to said indicating means for the quantitative indication of changes in said input signal attributable at least in part to the condition of the support matrix of the tooth under examination.

2. The combination set forth in claim 1, said exciter means comprising input signal application means adapted to be fitted to a patient's head to apply mechanical vibrations of a selected frequency as a signal input to the bony structure thereof, and oscillator generator means connected for energizing said signal application means.

3. The combination set forth in claim 2, said circuit means comprising a cathode follower, and an amplifier having a variable gain control connected in series with said probe transducer and said indicating means.

4. The combination set forth in claim 3, the working surface of said probe having a surface which is at least in part concave.

5. The combination set forth in claim 3, said exciter means comprising a loud speaker and a mounting fitted to apply an input signal to the bony structure of a patient's head.

6. The method of measuring tooth mobility comprising the steps of applying a mechanical vibration of preselected characteristics to the bony structure of a patient's head so as to pass through the support matrix of a tooth, receiving the resultant vibration through at least part of the tooth being tested, combining the received resultant vibration at least in part with said applied mechanical vibration, and measuring differences between selected characteristics of said applied vibration and said received resultant vibration as a quantitative indication of tooth mobility.

7. The method set forth in claim 6, the said step of applying a mechanical vibration to the bony structure of a patient's head comprising mechanical vibration in the form of ultrasonic oscillations.

References Cited in the file of this patent

UNITED STATES PATENTS

| | | |
|---|---|---|
| 566,103 | Waite | Aug. 18, 1896 |
| 591,160 | Dow | Oct. 5, 1897 |
| 1,242,778 | Darling | Oct. 9, 1917 |
| 1,916,782 | Crossley | July 4, 1933 |
| 2,393,717 | Speaker | Jan. 29, 1946 |
| 2,492,617 | Boland | Dec. 27, 1949 |
| 2,674,992 | Gilson | Apr. 13, 1954 |
| 2,712,309 | Offner | July 5, 1955 |
| 2,763,935 | Whaley | Sept. 25, 1956 |
| 2,771,554 | Gratzl | Nov. 20, 1956 |
| 2,829,638 | Douglas | Apr. 8, 1958 |
| 2,949,107 | Ziegler | Aug. 16, 1960 |